United States Patent
Schliesser et al.

(10) Patent No.: US 11,779,026 B2
(45) Date of Patent: Oct. 10, 2023

(54) DEVICE AND METHOD FOR CONSTRICTING AND/OR SEVERING A SAUSAGE STRAND

(71) Applicant: Albert Handtmann Maschinenfabrik GmbH & Co. KG, Biberach (DE)

(72) Inventors: Markus Schliesser, Wain (DE); Manfred Baechtle, Schemmerhofen (DE); Andreas Speh, Ummendorf (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 136 days.

(21) Appl. No.: 17/645,266

(22) Filed: Dec. 20, 2021

(65) Prior Publication Data

US 2022/0192208 A1    Jun. 23, 2022

(30) Foreign Application Priority Data

Dec. 21, 2020   (EP) .................................... 20215916

(51) Int. Cl.
*A22C 11/00*    (2006.01)
*A22C 11/10*    (2006.01)

(52) U.S. Cl.
CPC .......... *A22C 11/104* (2013.01); *A22C 11/006* (2013.01)

(58) Field of Classification Search
CPC ..... A22C 11/04; A22C 11/006; A22C 11/107; A22C 11/008

(Continued)

(56) References Cited

U.S. PATENT DOCUMENTS 3,971,101 A * 7/1976 Townsend .............. A22C 11/02
                                                                    452/45
7,862,407 B2 * 1/2011 Panizzon ............. A22C 11/104
                                                                    452/41

(Continued)

FOREIGN PATENT DOCUMENTS

CN       1568146 A       1/2005
CN       1934962 A       3/2007

(Continued)

OTHER PUBLICATIONS

Japanese Patent Office, Office Action Issued in Application No. 2021-205931, dated Jan. 27, 2023, 14 pages.

(Continued)

*Primary Examiner* — Richard T Price, Jr.
(74) *Attorney, Agent, or Firm* — McCoy Russell LLP

(57) ABSTRACT

The disclosure relates to a device for constricting and/or separating a sausage strand moving in direction of transport with two separating devices which in relation to sausage strand are disposed opposite one another, each comprising:
  a disk mounted to be rotatable about a first axis,
  a disk arranged thereabove mounted to be rotatable about a second axis with an axis spacing from first axis,
  at least two connecting elements, at least one of which comprises a displacement element,
where a first end of respective connecting element is mounted to be rotatable in first disk at a respective distance r from first axis and a second end in second disk is mounted to be rotatable at same distance from second axis, where connecting elements are guided such that at least one displacement element, during its rotation about first axis, is always aligned at a predetermined angle relative to direction of transport.

19 Claims, 9 Drawing Sheets

(58) Field of Classification Search
USPC .......................................................... 452/46
See application file for complete search history.

(56) References Cited

U.S. PATENT DOCUMENTS

| | | | | |
|---|---|---|---|---|
| 9,936,710 | B2 * | 4/2018 | Le Paih | ............... A22C 11/105 |
| 2006/0185529 | A1 | 8/2006 | Panizzon | |
| 2010/0184364 | A1 | 7/2010 | Le Pabic | |

FOREIGN PATENT DOCUMENTS

| | | |
|---|---|---|
| DE | 19906775 A1 | 8/2000 |
| DE | 19934154 C1 | 10/2000 |
| EP | 1434490 B1 | 1/2007 |
| EP | 1767096 A1 | 3/2007 |
| EP | 2142004 B1 | 1/2016 |
| JP | 2007082544 A | 4/2007 |
| WO | 03030646 A1 | 4/2003 |

OTHER PUBLICATIONS

China National Intellectual Property Administration, Office Action and Search Report Issued in Application No. 202111571577.4, dated Aug. 2, 2022, 21 pages.

* cited by examiner

DEVICE AND METHOD FOR CONSTRICTING AND/OR SEVERING A SAUSAGE STRAND

CROSS REFERENCE TO RELATED APPLICATION

The present application claims priority to European Patent Application No. 20215916.6 filed on Dec. 21, 2020. The entire contents of the above-listed application is hereby incorporated by reference for all purposes.

TECHNICAL FIELD

The disclosure relates to a device and a method for constricting and/or separating a sausage strand moving in the direction of transport.

BACKGROUND AND SUMMARY

Sausages are produced in the form of a sausage strand, e.g. either by ejecting the pasty mass into a sausage casing using a filler or by coextruding a sausage casing together with the pasty mass with the aid of a coextrusion device. Separating devices are provided in a known manner for producing individual portions and displace the pasty mass, i.e. constrict and/or separate, i.e. sever, the sausage strand.

Such a device is already shown, for example, in EP2142004 B1. In this device, displacement elements with an integrated cutting blade are already arranged on two oppositely disposed rotary disks. The displacement cutting elements are there always aligned perpendicular to the sausage strand by way a complex planetary gear. The construction is complicated, does not allow for high portioning performance, and is not very flexible when product parameters change. A device for portioning a sausage mass is also already known from EP1434490 B2, where oppositely disposed displacement elements are provided which are each arranged on two driven disks disposed in one plane. This embodiment has the drawback that only one displacement element can be arranged on one side, which means that no high portioning performance is possible.

Proceeding from this prior art, the present disclosure is based on the object of providing a device and a method for constricting and/or separating having simplified mechanics, which at the same time enables high flexibility and high portioning performance.

This object is satisfied according to the disclosure by.

a device according to the disclosure for constricting and/or separating a sausage strand moving in the direction of transport T with two separating devices which in relation to the sausage strand are disposed opposite one another. The separating devices each comprise a disk mounted to be rotatable about a first axis as well as a disk which is arranged offset in the vertical direction and rotatable about a second axis with an axis spacing x from the first axis. The second disk can be arranged above the first disk. The second disk can be mounted to be rotatable in the second axis. Furthermore, the device comprises at least two connecting elements, at least one of which comprises a displacement element. The respective connecting elements are mounted to be rotatable in particular in the first disk at a respective distance from the first axis and in the second disk at the same distance from the second axis. The connecting elements can be guided such that the at least one displacement element during its rotation about the first axis is always aligned at a predetermined angle, in particular 90°, relative to direction of transport T. However, the first and the second axis do not necessarily have to span a plane that is at a right angle to direction of transport T. The axes can also span a plane that runs offset from the direction of transport, i.e. at an angle to the direction of transport, e.g. at an angle of 30°. The displacement elements must then also be positioned to be inclined at this angle relative to the connecting element.

Constricting is understood to mean the displacement of the pasty mass in the sausage strand, whereby the sausage strand is divided into individual portions and separating means the sausage strand is severed into individual portions or sausage chains with a certain number of individual portions.

With this very simple mechanism, it can always be ensured that the displacement elements are aligned correctly during their rotation. A corresponding solution can be implemented in an easy and inexpensive manner. The solution according to the disclosure makes it possible that several displacement elements can be provided for every disk so that the portioning performance can be increased significantly. In particular, portioning performance of more than 3000 portions/minute can be achieved. Due to the light-weight structure of the parallel guide and the resulting low moment of inertia, the first and the second axis can be operated at high, in particular also dynamically variable speeds (e.g. up to 2000 rpm).

The device according to the disclosure can also be easily adapted to different portion lengths, for example, in that the number of displacement elements for every disk is reduced accordingly and/or the rotational speed of the first driven disk is adapted accordingly. The parallel guidance of the displacement elements is advantageously effected without a gear stage, but rather by way of the respective connecting element and the arrangement of the reception by a lower and an upper disk. With this simple structure, a large number of displacement elements arranged having a very small spacing can be attached.

The distance r can be the same or be different for different connecting elements. This means that the connecting elements are either all mounted on a circle having a radius r to be rotatable in the first and the second disk or some on a circle having a first radius and some on a circle having a second radius. If connecting elements are arranged at a greater distance r from the axis of rotation, then they project further into the sausage strand during separation and can be used for separating, i.e. for severing, while the connecting elements which are arranged at a smaller distance r from the first and the second axis of rotation can only be used for constriction or displacement, respectively. This enables displacement elements of the same configuration to be used once for separating and another time for severing, depending on the distance r from the axis of rotation. In this way, individual portions or sausage chains with a certain number of sausages can be produced in a simple manner. By choosing a certain distance from the axes of rotation, the device can also be adapted to different sausage sizes.

The displacement elements of the oppositely disposed separating devices are moved toward one another to such an extent that they constrict and/or sever the sausage strand.

The displacement elements are configured in particular to be plate-shaped and comprise a recess, the dimensions of which decrease away from the side facing the sausage strand and which is configured in particular to be V-shaped. This simple configuration enables the use for constricting and also the use for severing by shearing off using displacement elements of the oppositely disposed separating devices that are moving toward one another.

According to an embodiment, a separating device comprises at least two, in particular at least three connecting elements, and at least one displacement element, in particular at least three displacement elements, i.e. in particular at least one displacement element for every connecting element.

If the separating device comprises at least three displacement elements, then the production performance can be increased significantly. It is also possible that more than three connecting elements and more than three displacement elements are provided.

The device can of course also be operated with two connecting elements, but starting from the position where the two displacement elements are in alignment is undefined because no torque is transmitted from the lower disk to the upper disk in this position. Torque transmission is possible beyond this dead point position. A more reliable operation can be reasonably obtained with three or more connecting elements, in particular if the second disks are not driven in any other way.

According to an embodiment, the connecting elements are mounted to be rotatable in bores in the first and the second disk and, in particular, are arranged to be exchangeable. This has the advantage that, depending on a respective portioning assignment, the connecting elements can be plugged on in a simple manner in such a way that a certain sausage length is produced and/or a certain number of portions in a sausage chain.

The bores on the first and the second disk can either be arranged on a circle having radius r or on several circles having different radii r, where either bores at the same distance from the first and the second axis are always populated with connecting elements or bores having different distances from the axes of rotation. In this way, the device can be configured suitably in a simple manner or can also be retrofitted at the customer's facility without major structural measures being necessary there. According to an embodiment the displacement elements can therefore be used as displacement elements or cutting elements depending on distance r.

However, it is also possible that the respective connecting elements are arranged with the displacement elements on a circle having the same diameter, but that displacement elements are configured differently. With a displacement element which is used only for constricting, the point of the recess in the displacement element that is most distant in the direction of the sausage strand is further back than the most distant point of the recess of a displacement element which is used for severing. This means that a displacement element for constricting is configured or arranged such that, when the displacement elements of the oppositely disposed separating devices move toward each other perpendicular to the sausage strand, an open region remains in the region of the recesses, such that the sausage strand is only constricted and not severed. If the displacement elements are used for separating, then the displacement elements move into the sausage strand to the extent that no open region remains in the superimposed displacement elements and the sausage strand is severed.

One or more displacement elements can be used for constricting and at least one displacement element can be used for separating.

According to an embodiment, the device comprises a drive mechanism with which can be the first disks are driven (directly or indirectly via other disks), where the rotational motion can be transferred to the second disks respectively via the at least two connecting elements. The first disks of the two oppositely disposed separating devices are driven synchronously in opposite directions. Alternatively or additionally, the second disks can also be driven. If the second disks are arranged above the first ones and are disposed offset from the center, then they can also mesh with one another. Then the first disks do not have to be coupled directly.

It is only crucial that a drive mechanism is provided such that all disks rotate at the same rotational speed (rpm) and that the first disks of the oppositely disposed separating devices rotate synchronously in opposite directions.

According to an embodiment, the device comprises a control device which controls a drive, for example, at least one motor, such that the first disks are driven at constant or variable rotational speed. For example, a certain speed profile can then also be run, such that, for example, the speed, i.e. the rotational speed of a displacement element, changes in dependence of its rotation position and can be adapted to the speed of the sausage strand, in particular when constricting or severing.

The speed component of the respective displacement element in direction of transport T during the constriction and/or separation corresponds in an advantageous manner substantially to the speed of a transport device for transporting the sausage strand. Particularly reliable constriction or separation can then be achieved.

However, it is also possible that the speed of the displacement elements during the constriction and/or separation is greater than the speed of the transport device. This in turn has the advantage that portions can be produced that are shorter than the spacing between the displacement elements, e.g. up to 15 mm, which can further increase the portion performance.

A third possibility is that the displacement elements, i.e. the drive, is stopped when the displacement elements are presently not constricting and/or separating, so that portions of any length can be produced.

The speed of the displacement elements can therefore be constant or vary during one rotation.

It is also possible that several, e.g. two displacement elements are arranged in the vertical direction on the connecting elements so that several, e.g. two sausage strands transported one above the other can be portioned.

According to an embodiment, the displacement elements are arranged to be detachable from the connecting elements. For example, if one wanted to produce a longer single portion, then a displacement element can be removed so that, for example, twice the sausage length can be produced, or the displacement element can be attached to another connecting element in order to obtain a different sausage length. However, the displacement elements can also be arranged, for example, on different connecting elements which are at a different distance from the axis of rotation in order to be used either for separating or for cutting. This means, that, for adjusting or changing the sausage length or the number of individual portions of a sausage chain, either connecting elements are arranged at different positions between the first and the second disk and/or the displacement elements are arranged accordingly on existing connecting elements and/or those of the disks are adjusted accordingly.

The connecting elements can comprise a first section which extends from one, for example, the first disk, can be substantially perpendicularly in the direction toward the oppositely disposed, e.g. second disk, and a second section which extends either horizontally, inclined, step-shaped, or wave-shaped toward the oppositely disposed disk at least up to an axis where it is mounted to be rotatable, where the corresponding displacement element can be arranged at the first section. The number of connecting elements on a disk can be increased by an inclined, step-shaped, or wave-shaped configuration because the connecting elements are less able to interfere with one another with a rotation of the first disk about the first axis.

According to an embodiment, the device further comprises a third disk which comprises further connecting elements that are mounted to be rotatable in the second and the third disk, where at least one of the connecting elements comprises a displacement element. It is then possible to portion two sausage strands transported on top of one another and to thereby to increase productivity. The second disk can be mounted by way of the connecting elements of the second and the third disk and then rotate about virtual axis B, C.

The disclosure also relates to a method for constricting and/or separating a sausage strand moving in the direction of transport according to claim 16.

According to an embodiment, the first and the second disk comprise bores in which the connecting elements can be arranged, for example, in an exchangeable manner, where the bores are either arranged on a circle having a radius r or on several circles having different radii r. Depending on the portion length and/or the sausage size and/or the number of individual portions in a sausage chain, the respective connecting element can then be mounted in a suitable bore. If the above-mentioned parameters change, then the position or the bore, respectively, in which the corresponding connecting element is inserted can be changed. This enables great flexibility and options for adaptation to different product and production conditions.

The disclosure shall be explained below in more detail with reference to the following figures.

DETAILED DESCRIPTION

Figure 4:
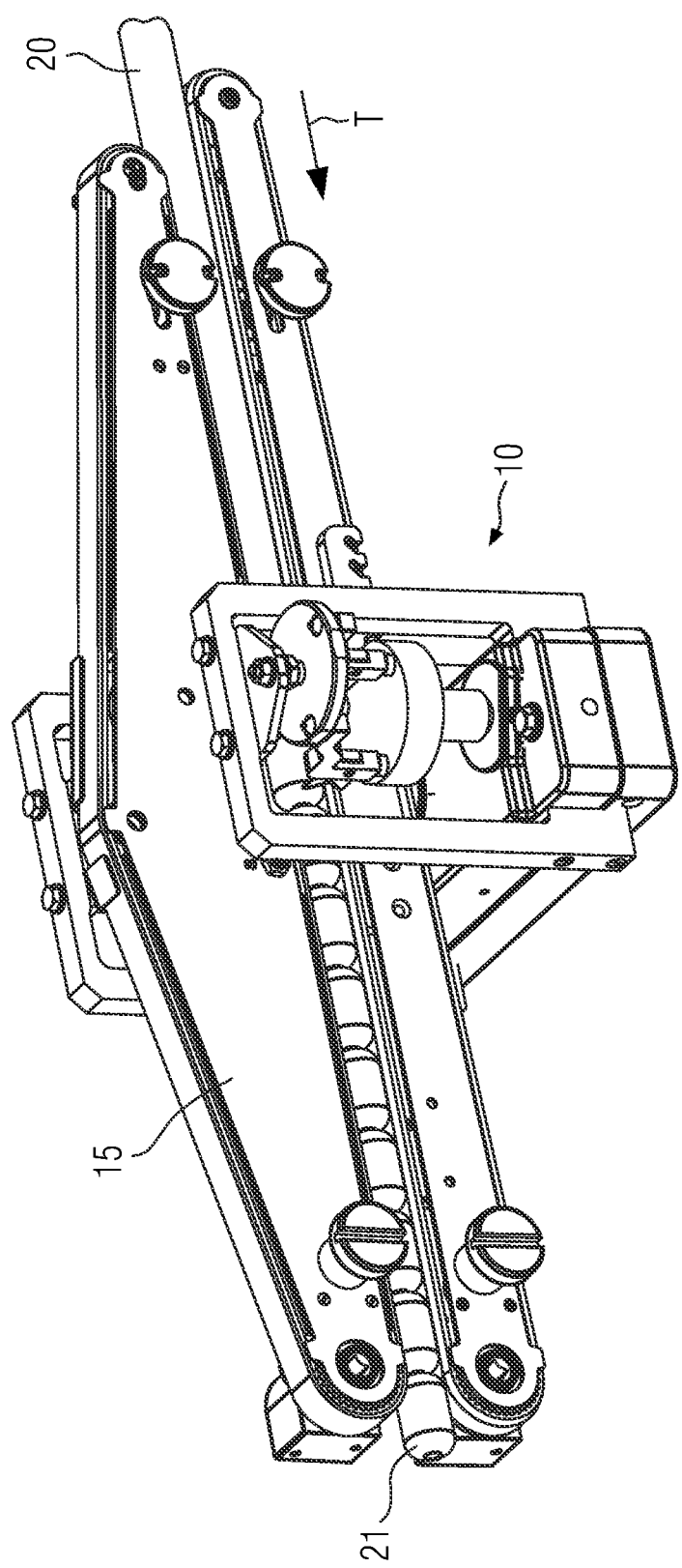
FIG. 4 shows an embodiment in a perspective illustration with a transport device.
Figure 5:
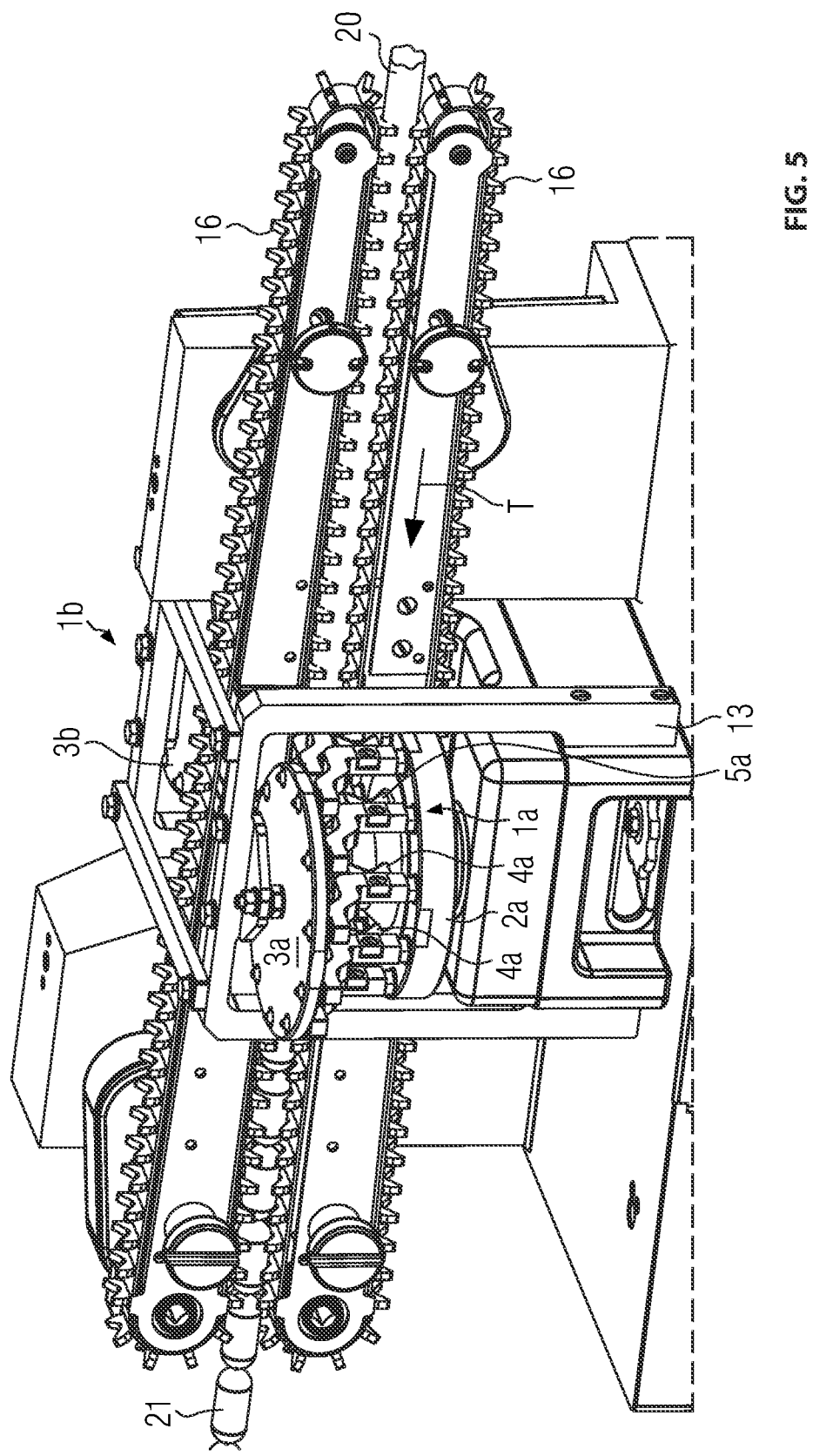
FIG. 5 shows a further embodiment with a plurality of displacement elements.

FIG. 4 shows a device 10 for constricting and/or separating a sausage strand with a transport device 15 for sausage strand 20. Device 10 divides the sausage strand into individual portions 21 or sausage chains Transport device 15 presently comprises, for example, two circulating transport devices, e.g. conveyor belts or chains, where the upper transport device, for example, comprises spaced webs or ribs 16 that run with regular spacings transverse to direction of transport T and between which the displacement elements can then engage with the sausage strand from both sides, as shown, for example, in FIG. 5. The webs project from the surface of the transport device. The lower circulating belt as well can comprise respective webs or ribs 16 and/or have a substantially concave shape in cross section such that the sausage strand cannot roll sideways from the belt, as illustrated in FIG. 5. The displacement elements can dip inbetween the webs such that displacement elements 5 can engage with the sausage strand.

The lower conveyor belt in FIG. 4 can be formed, for example, concave transverse to the direction of transport such that the sausage cannot roll off the belt, i.e. is adapted to the shape of the sausage. A so-called sausage lifter is disposed, for example, optionally upstream of device 10 and raises the sausage strand from the conveyor belt like a jump so that the displacement elements can reach underneath the sausage strand (not shown).

The upper conveyor belt can be deflected with additional deflection rollers in the shape of an arc over the displacement elements. Space can therefore also be created in this way for the displacement elements.

Figure 1:
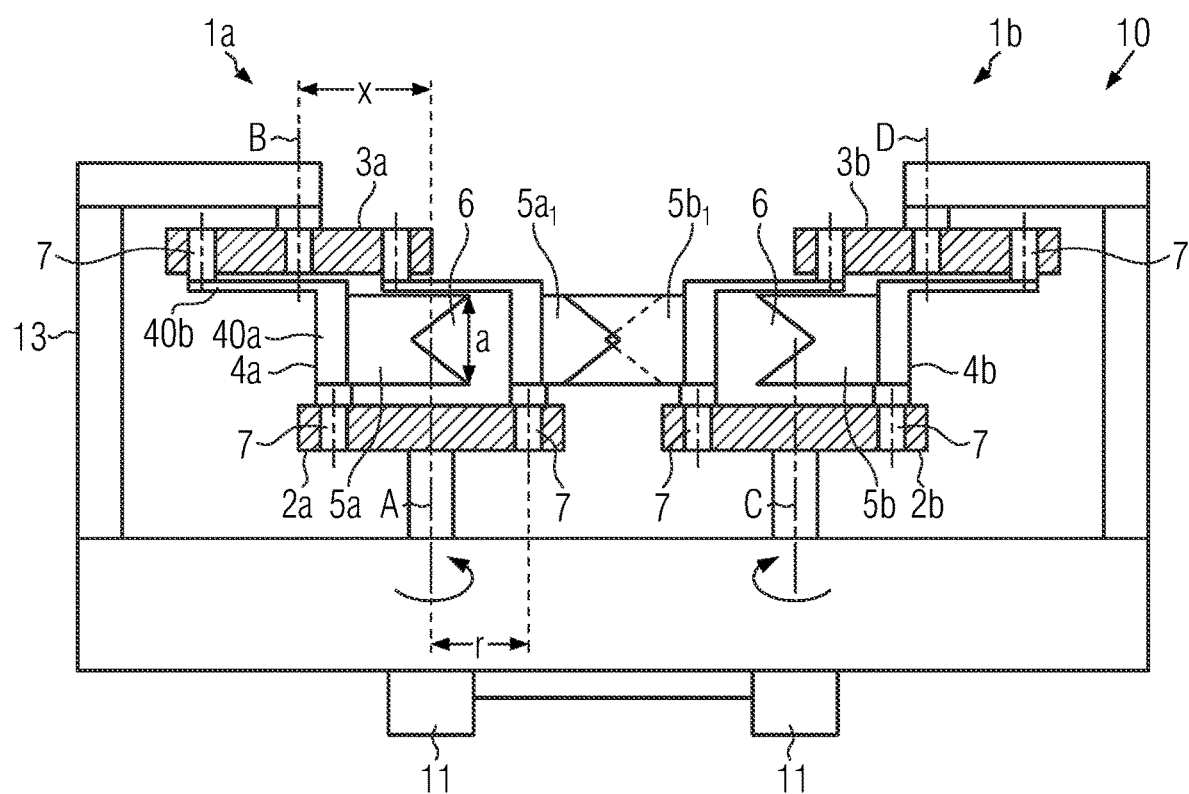
FIG. 1 shows schematically a sectional view through a device according to an embodiment of the present disclosure.

The configuration could also be such that the displacement elements are arranged in the direction of transport downstream of the conveyor belts. This eliminates the issue of collisions. FIG. 1 shows a possible embodiment of a device for constricting and/or separating a sausage strand moving in direction of transport T. The device comprises two separating devices 1a, 1b which are disposed opposite one another in relation to sausage strand 20, which is not shown in FIG. 1.

As can be seen in FIG. 1, separating devices 1a, 1b each comprise a first disk 2a, 2b which is mounted to be rotatable about a first axis A or C, respectively. The first disks can be driven synchronously in opposite directions by a drive mechanism 11. In the case of a drive, e.g. a motor, axes A and C can be coupled, for example, by way of a mechanical gearing, e.g. toothed wheels, toothed belts, etc., or an electronic gear, for example, by using two motors.

In addition to first disks 2a, 2b, the device also comprises disposed above the former two second disks 3a, 3b arranged offset which are arranged parallel to the first disks and whose axes of rotation B, D are spaced by an axial distance x. Second disks 3a, 3b are connected to first disk S1 by way of several connecting elements 4a, 4b. Second disks 2a, 2b are mounted to be freely rotatable about axis B, D and are driven via connecting elements 4a, 4b$_1$.

However, it would also be possible for the second disks to be driven and the rotational motion to be transmitted to the first disks. To couple the disks of the first and the second separating device would also be possible if the second disks were both offset inwardly and then mesh with one another in a toothed manner.

It is only crucial that a drive mechanism is provided such that all disks rotate at the same rotational speed and the respective disks of the oppositely disposed separating devices rotate in opposite directions.

A first end region of connecting element 4a, 4b is mounted in a bore 7 to be rotatable about an axis which is spaced from first axis A by a distance r and which runs parallel to the latter. The upper end region of connecting element 4a is likewise mounted in a bore 7 to be rotatable about an axis which is spaced by the same distance r from central axis B of second disk 3a, 3b. In FIG. 1, two connecting elements are shown for every separating device 1a, 1b. Upper disks 3a, 3b are suspended by way of a holder 13. A displacement element 5a, 5b is arranged on at least one connecting element 4a, 4b of each separating device 1a, 1b. Respective displacement element 5a, 5b at its end facing sausage strand 20 comprises a recess 6, presently a V-shaped recess. Dimension a of recess 6 decreases in a direction pointing away from sausage strand 20. The device shown in a sectional view in FIG. 1 can further comprise a third or more connecting elements 4a, 4b being arranged accordingly. In the embodiment shown in FIG. 1, distance r is equal for all connecting elements shown.

While it is crucial that distance r for a connecting element is equal for upper and lower disk 2a, 2b, 3a, 3b, distance r for different connecting elements 4a, 4b can also be different, as shall be explained in more detail below. The parallel crank guide described above enables connecting elements 4a, 4b to be guided such that at least one displacement element 5a, 5b during its rotation about first axis A, C always remains oriented at a predetermined angle, optionally 90°, relative to direction of transport T of sausage strand 20. Separating devices 1a, 1b are configured symmetrically to one another.

Displacement element $5a_1$ shown in FIG. 1 which is presently configured to be plate-shaped, and displacement element $5b_1$ which is likewise configured to be plate-shaped are moved toward one another by the rotation about the axes A and C such that the plates overlap accordingly and, for example, only an opening 14 of recess 6 remains open such that the sausage strand is constricted. If displacement elements $5a_1$, $5b_1$ project so far forward to the oppositely disposed separating device that no opening 14 remains and the displacement elements overlap entirely, the sausage strand is completely severed, i.e. cut off.

Figure 2:
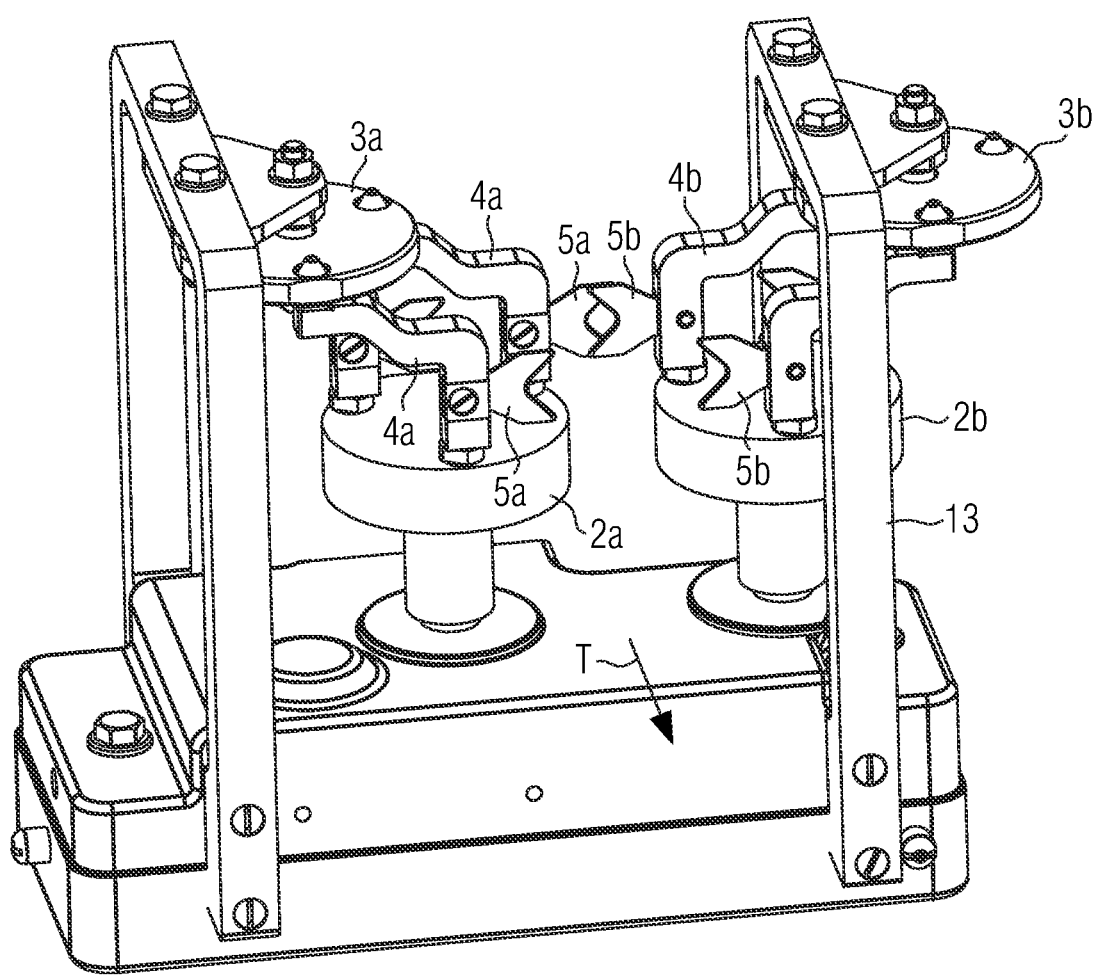
FIG. 2 shows schematically a perspective illustration of a further embodiment according to the present disclosure.

FIG. 2 shows an embodiment which corresponds substantially to the embodiment shown in FIG. 1, with separating devices 1a, 1b each with three connecting elements 4a, 4b, each of which comprises a displacement element 5a, 5b. As can be seen in FIG. 2, displacement elements 5a, 5b during their rotation about axes A, C always remain aligned perpendicular to the sausage strand, presently not shown.

Figure 3A:
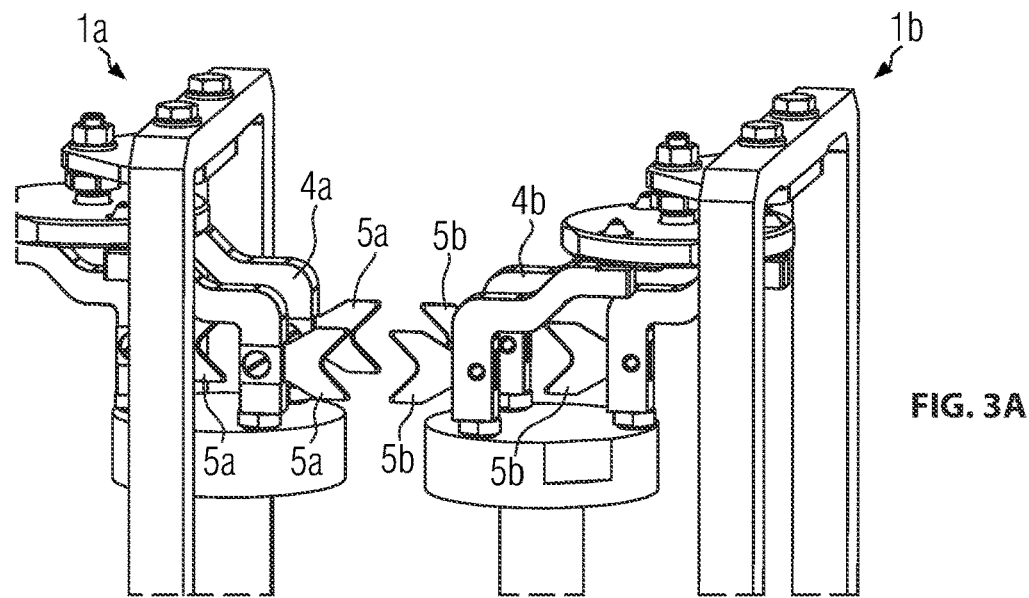
FIG. 3A shows the embodiment shown in FIG. 2 from a different perspective with the displacement elements open.
Figure 3B:
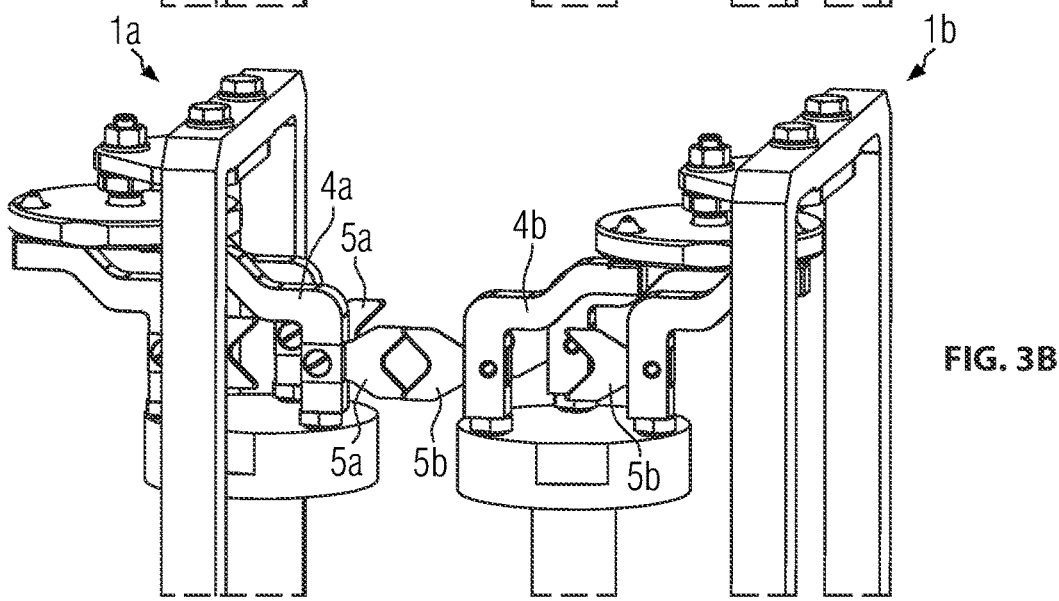
FIG. 3B shows the embodiment shown in FIG. 3A with the displacement elements closing.
Figure 3C:
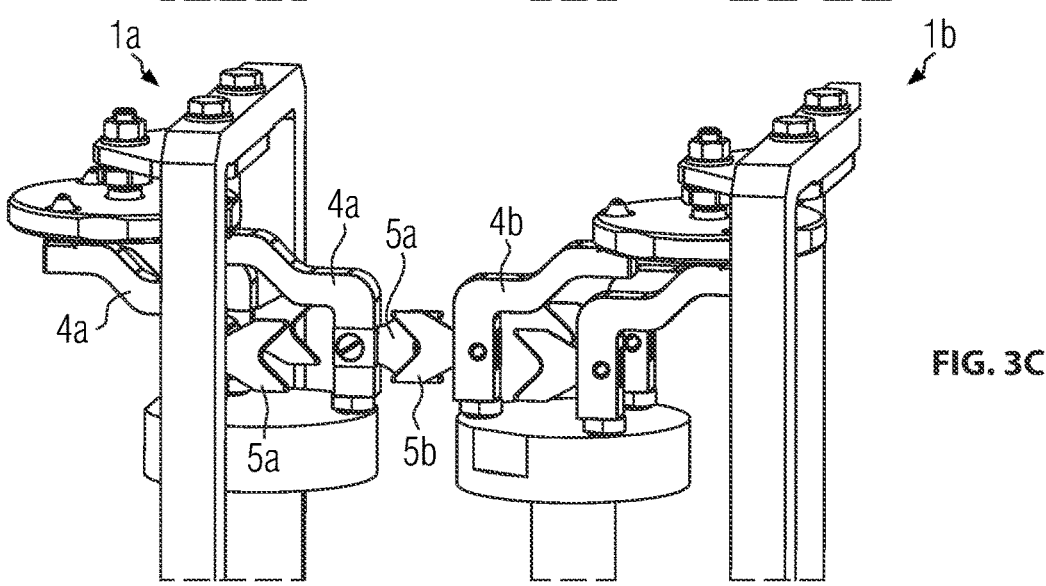
FIG. 3C shows the embodiment shown in FIGS. 3A, 3B with the displacement elements closed.

The embodiment shown in FIGS. 3A-3C corresponds to the embodiment shown in FIGS. 1 and 2 with the exception that the displacement elements can be moved toward one another, i.e. can dip into the sausage strand to such an extent that the sausage strand can be divided into individual sausages. FIG. 3A shows the three displacement elements, which are aligned perpendicular to direction of transport T and which presently have the function of separating, i.e. cutting elements, in a position in which the sausage strand can be transported freely through the opening between oppositely disposed displacement elements 5a, 5b. If disks 2a, 2b, 3a, 3b continue to rotate, then separating elements 5a, 5b begin to move toward one another, as shown in FIG. 3B, until they overlap entirely, as shown in FIG. 3C, until an opening 14 between displacement elements 5a, 5b is no longer provided and the sausage strand is completely severed. If the disks continue to rotate, then respective displacement elements move apart again until the subsequent displacement elements overlap entirely and separate the sausage strand for separating the next sausage portion.

As can be seen in particular in FIGS. 1-3C, the connecting elements and the displacement elements are configured and positioned such that they move past one another during a complete rotation of disks 2a, 2b, 3a, 3b without striking against one another. The axial offset of the pivot bearings in the upper and lower disk of adjacent connecting elements also corresponds, for example, to offset x of axes A and C or C and D, respectively. The distance between the pivot bearings and neighboring connecting elements (presently chord length) may be greater than the extension of a connecting element including the displacement element, plus free space. This means that connecting elements arranged in alignment are spaced apart with the respective displacement element. In particular, the displacement elements also have a lower height than a first section 40a of connecting elements 4a, 4b which extends upwardly in the vertical direction.

In FIG. 1, the connecting element is, for example, L-shaped, therefore presently comprises a first section 40a which extends from first disk 2a, 2b perpendicularly upwardly in the direction toward second disk 3a, 3b and a second section 40b which presently extends horizontally and parallel to second disk 3a, 3b, namely at least up to the axis about which the connecting element is mounted to be rotatable. The displacement element is arranged on first section 40a. However, it is also possible for second section 40b to be configured to be inclined, step-shaped or wave-shaped. A wave-shaped configuration is shown, for example, in FIGS. 2-3C. The distance between the connecting elements can be minimized by way of an inclined, step-shaped or wave-shaped arrangement.

FIG. 5 shows a further embodiment according to the present disclosure which corresponds to the previously shown embodiments, but where more than three connecting elements are arranged. In this case, for example, 10 connecting elements 4a, 4b with respective displacement elements 5a, 5b are provided. The displacement elements are positioned and configured such that, for example, they separate the sausage strand into individual sausages, i.e. shear them off. In the same manner, the displacement elements could also be configured as previously described such that they only constrict the sausage strand for producing a connected sausage chain made of individual sausages.

As is also possible in the previous embodiments, some of the displacement elements can be used at the same time for constricting and at least one for separating or cutting off, respectively. such that sausage chains of a certain length can be produced.

Figure 6:
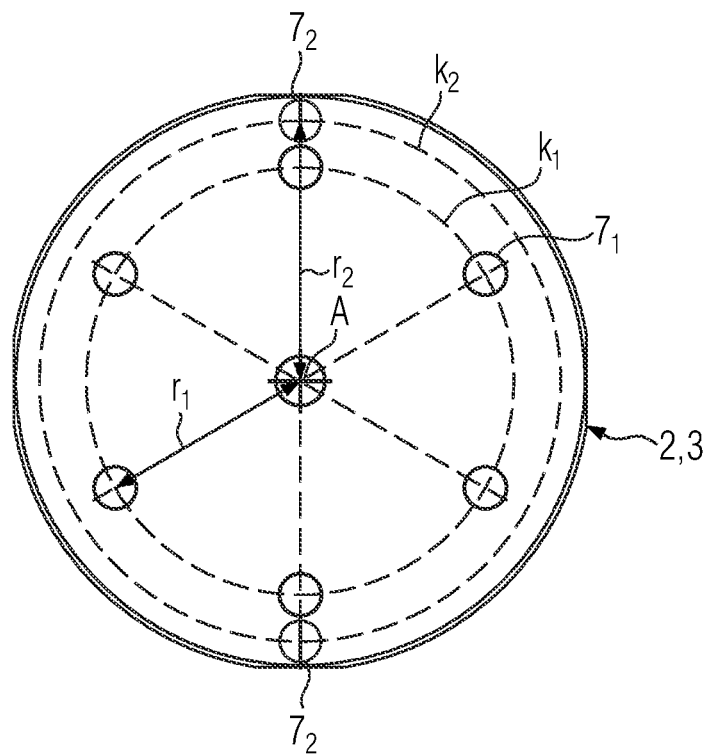
FIG. 6 shows schematically a view of a disk with several bores on circles having different diameters.

FIG. 6 shows schematically a view of first or second disk 2, 3. Corresponding disk 2, 3 comprises on its inner side a plurality of bores 7, where bores $7_1$ are arranged on a circle $k_1$ having radius $r_1$. In addition, one or more bores $7_2$ can be arranged on at least one further circle $k_2$ having a radius $r_2$ (or for n circles, a radius $r_n$, where $n \in N$). A correspondingly configured disk entails great adaptability for different applications and sausage lengths. For example, bores 7 can be populated with connecting elements 4a, 4b in accordance with a desired sausage length. If, for example, only every second bore $7_1$ is populated, then a corresponding sausage portion has approximately twice the length at the same rotational speed. Bores $7_2$ on second circle $k_2$ can be used, for example, for connecting elements 4a, 4b with displacement elements 5a, 5b for separating, i.e. severing the sausage strand, since the displacement elements then accordingly project farther into the sausage strand. If, in the embodiment shown in FIG. 6, bores (in a 0° and 180° position) on outer circle $k_2$ were to be populated with connecting elements and the remaining bores on circle $k_1$ having smaller radius then the displacement elements on the connecting elements in openings $7_2$ could be used as displacement elements for cutting off, while the other displacement elements only constrict. For example, sausage chains with four individual sausages could then be produced with a corresponding arrangement.

Figure 7:
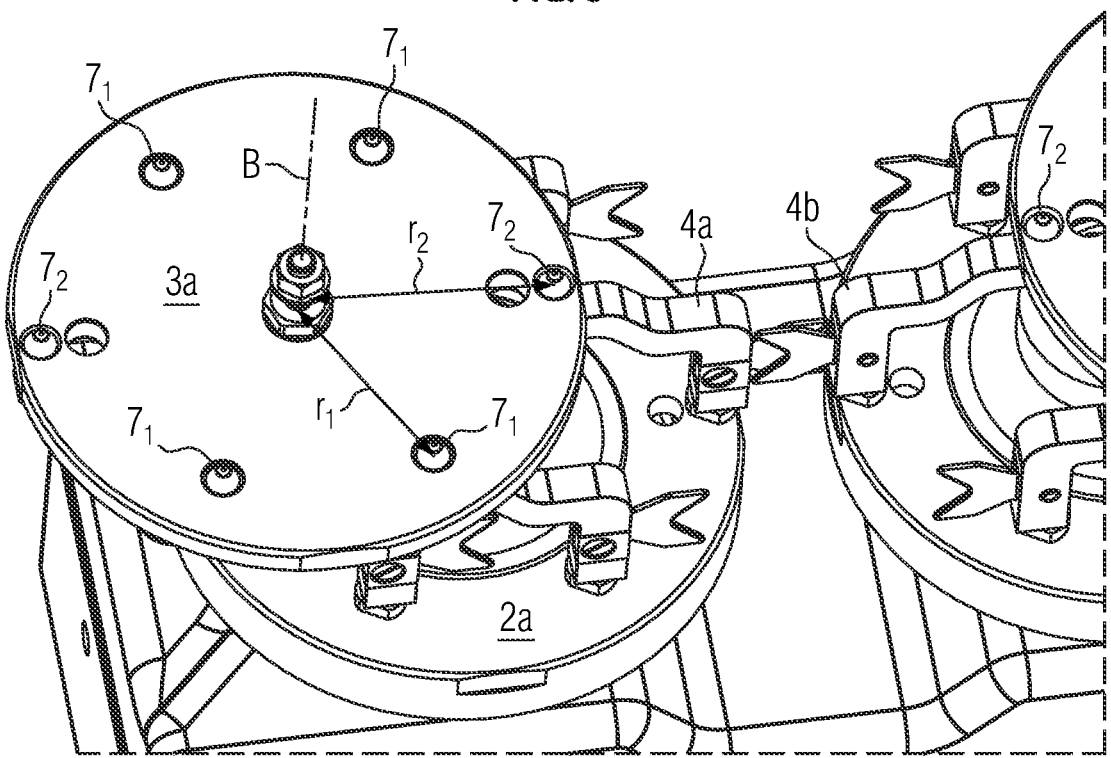
FIG. 7 shows schematically a perspective illustration of a further embodiment.

FIG. 7 shows a further embodiment which corresponds substantially to the previous embodiments. Here as well, several bores $7_1$ are provided on an inner circle $k_1$ and an additional bore $7_2$ having a larger radius $r_2$, as the plan view onto upper second disk 3a shows.

For example, connecting elements are presently mounted to be rotatable in the four inner bores and two connecting elements in outer bores $7_2$. First disk 2a is populated accordingly Oppositely disposed separating device 1b can be configured accordingly.

Figure 8:
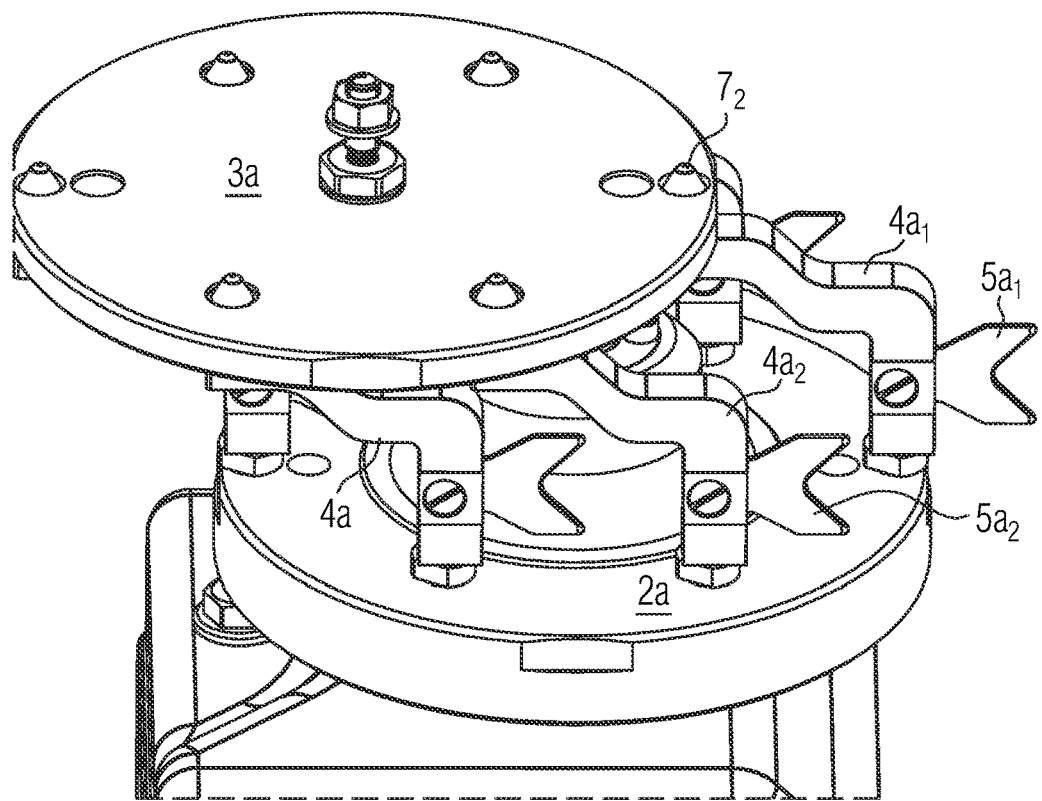
FIG. 8 shows a separating device of the embodiment shown in FIG. 7 from a different perspective.

FIG. 8 shows the arrangement shown in FIG. 7 from a different perspective, where two successive connecting elements $4a_1$, $4a_2$ with displacement elements $5a_1$, $5a_2$ are shown, and where connecting element $4a_2$ on the left-hand side is arranged on a circle having radius $r_1$ and connecting element $4a_2$ on the right-hand side in a bore $7_2$, on a circle having radius Displacement element $5a_1$ projects in the direction of the oppositely disposed separating device to the extent that separation is possible.

Figure 9:
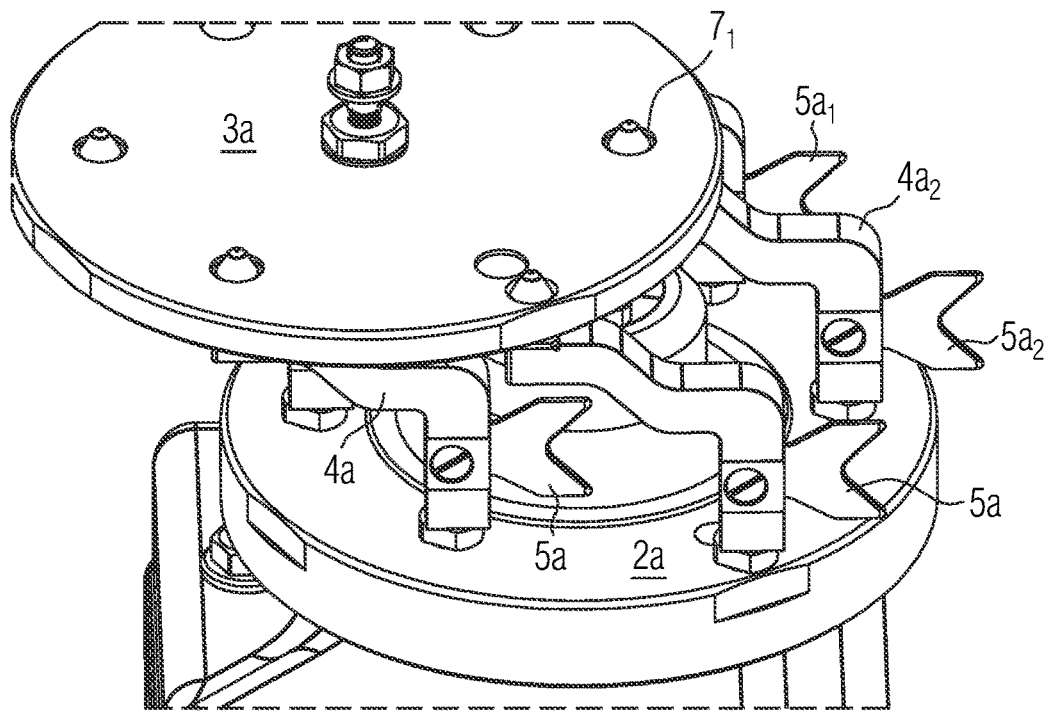
FIG. 9 shows in perspective the embodiment shown in FIG. 7 in which the disks have continued to rotate.

In FIG. 9, disks 2, 3 have already rotated onward such that subsequent displacement element $5a_2$ is now in a constricting position. As can be clearly seen, connecting element $4a_1$ in FIG. 8 with corresponding displacement element 5a1 projects farther in the direction of the sausage strand than connecting element $4a_2$ with displacement element $5a_2$ in FIG. 9. This makes it clear that the displacement elements, the connecting elements of which are mounted further outwardly in the radial direction, can be used, for example, for separating, while the connecting elements arranged further inwardly can be used for constricting.

In addition to a high possible portion performance, the present: disclosure therefore also allows for the system to be adapted to a desired product without major retooling. As already described, the position of the connecting element can determine how far the displacement element projects into the sausage strand. However, the shape of the displacement element can also be used equally to set whether and to what extent a sausage strand is constricted or separated. For this purpose, it is also possible to attach the displacement elements to the connecting elements in a detachable and thus also exchangeable manner.

The device also comprises a control device which controls the at least one drive such that first disks 2a, 2b are driven at a constant or variable rotational speed. For example, a certain speed profile can then also be run such that, for example, the speed of a displacement element changes in dependence of its rotational position, in particular the speed component in the direction of transport can be adapted to the speed of the sausage strand during constricting or by severing. Advantageously, the speed component of the respective displacement element in direction of transport T when constricting and/or separating corresponds substantially to the speed of a transport device 15 for transporting sausage strand 20. Particularly reliable and gentle constricting or separating can thus be achieved.

Figure 10A:
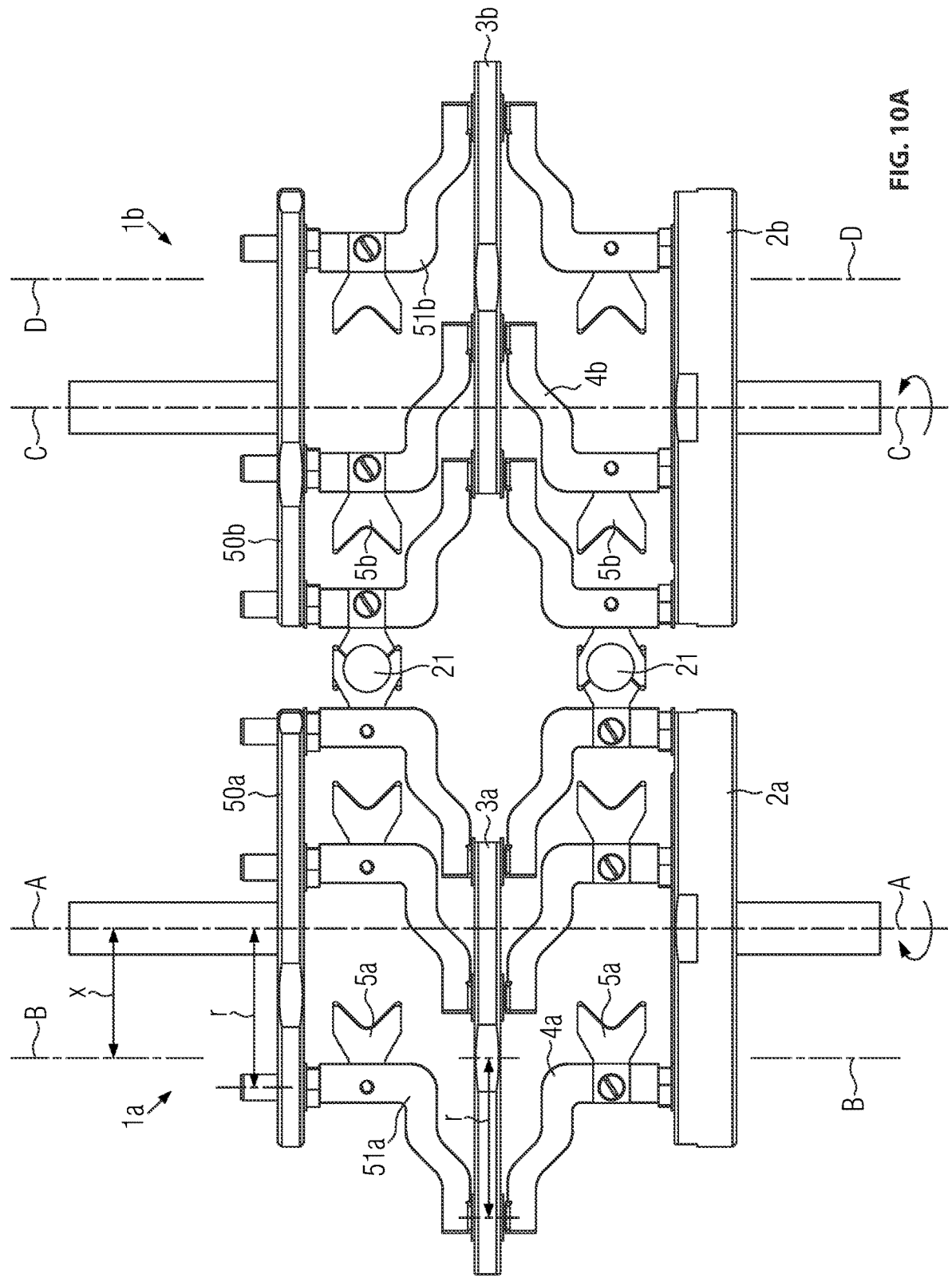
FIGS. 10A and B show a further embodiment according to the present disclosure with three disks.
Figure 10B:
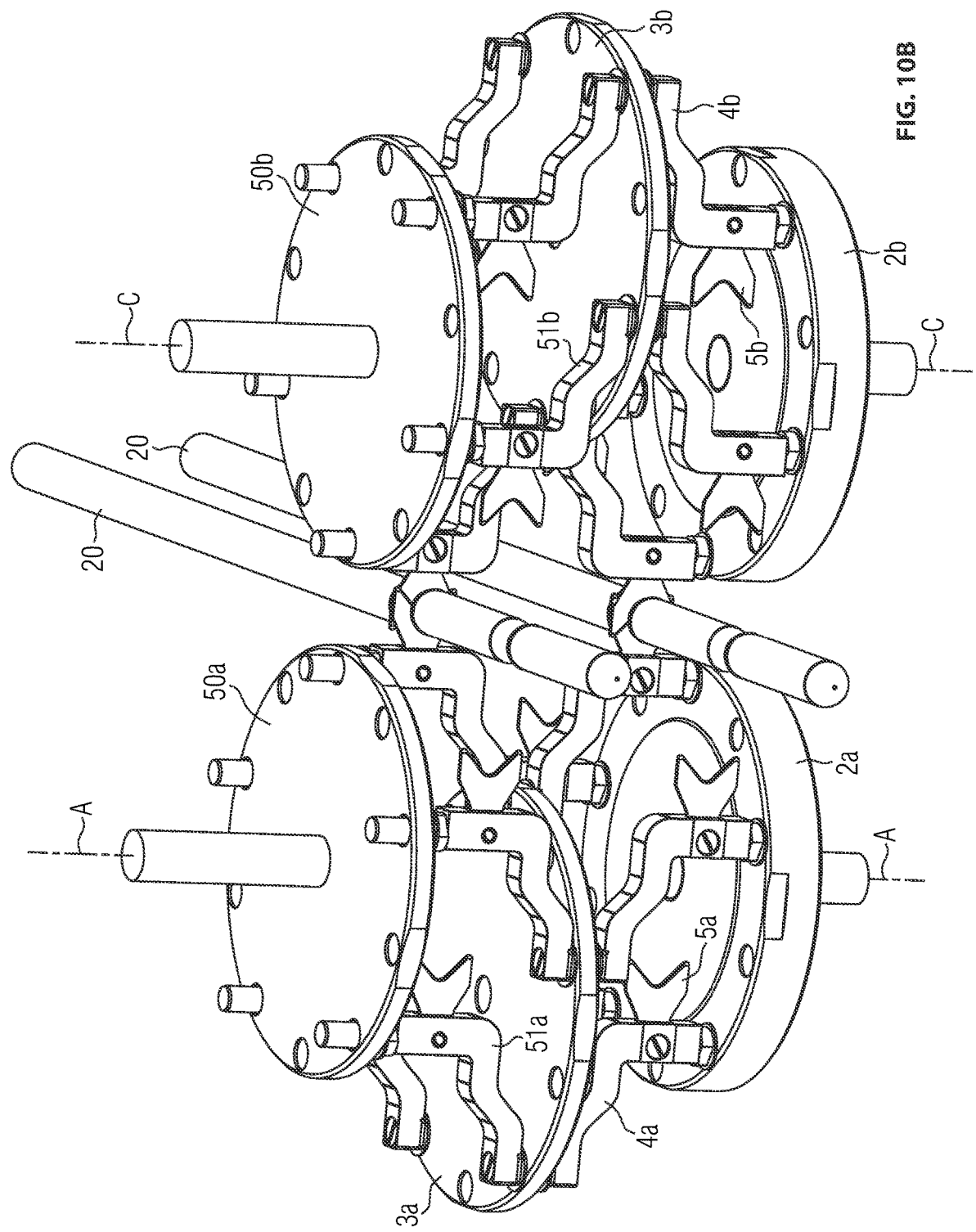

As can be seen in FIGS. 10A and 10B, it is also possible that the device further comprises a third disk 50a, 50b which comprises further connecting elements 51a, 51b that are mounted to be rotatable in the second and the third disk, where at least one of the connecting elements comprises a displacement element.

FIG. 10A shows a view in the direction of transport onto this further embodiment, while FIG. 10B shows a perspective illustration. This embodiment works according to the principle of a parallel crank coupling. Here as well, for example, the first disk of each separating device 1a, 1b is driven by a drive (presently not shown) and first disk 2a is connected to second disk 3a, 3b each by way of connecting elements 4a, 4b. Disk 3a, 3b is again connected by way of further connecting elements 51a, 51b to a third disk 50a, Sob which is likewise mounted to be rotatable about an axis, presently, e.g. axis A. This does not necessarily have to be axis A, it can also be offset laterally (as described farther below). The mounting of connecting elements 4a and 51a does not have to be aligned either. It is even better for the concentricity if they are mounted in disk 3a offset from one another by an angle.

Here as well, the respective connecting element is mounted to be rotatable in first disk 2a, 2b at a respective distance r from first axis A, C and in second disk 3a, 3b at the same distance r from the second axis. The connecting elements Ma, 51b are also mounted to be rotatable in third disk 50a, 50b at the corresponding distance r to the axis of rotation of third disk 50a. Unlike in the previous examples, second disk 3a, 3b is not mounted to be rotatable in second axis B, but by way of connecting elements 4a, 4b, or 51a, 51, respectively. Rotating disk 2a transmits a torque to second disk 3a, 3b via connecting elements 4a, 4b such that it rotates about "virtual axis" B. Third disk 50a, 50b can be mounted to be rotatable by way of a holder, as shown in FIGS. 10A and 10B. Connecting elements 51a, 51b transmit a torque onto third disk 50a, 50b. In the embodiments shown in FIGS. 10A and 10B, the axis of rotation of third disk 50a corresponds to axis of rotation A of first disk 2a. It is also possible that the axis of rotation of third disk 50a, 50b is offset from the axis of rotation of first disk 2a, in which case the geometry of connecting elements 51a, 51b and/or the displacement elements must be adapted accordingly so that the displacement elements can engage with the sausage strand for constricting and/or separating.

It is applicable here as well, for example, that the distance between the axis of rotation of uppermost disk 50a, 50b is again spaced from the axis of rotation of connecting elements 51a, 51b by the same radius r as distance r between axis of rotation B, D of the second disk and the position at which the respective connecting element is mounted to be rotatable As is also described in the context of the previous embodiments, however, distance r can be selected differently for different connecting elements; it is then only necessary that, a connecting element be arranged at same distance r from the axis of rotation of the respective disks between which it is situated.

In an embodiment not shown, the connecting element has such a large extension in the vertical direction that, for example, two displacement elements 5a, 5b can be arranged one above the other in the vertical direction, so that, for example, two sausage strands can likewise be separated one above the other.

In the method according to the disclosure for constricting and/or separating a sausage strand 20 moving in direction of transport T, a device according to the previous embodiments is used, where connecting elements 4a, 4b are mounted to be rotatable between first and second disk 2a, 2b, 3a, 3b and with a rotation of first disk 2a, 2b about first axis A are guided such that at least one displacement element 5a, 5b during its rotation about first axis A is always aligned at a predetermined angle, in particular 90°, relative to direction of transport T.

As described, the disks can comprise bores 7 in which the connecting elements are mounted to be rotatable and the bores are arranged either on first and second disk 2a, 2b, 3a, 3b on a circle having a radius r or on several circles having different radii and connecting elements 5a, 5b are mounted in corresponding bores 7 in dependence of the portion length and/or the sausage size and/or the number of individual portions in a sausage chain and in particular the position of connecting elements (5a, 5b) is changed accordingly when the sausage size and/or the portion length and/or the number of individual portions in a sausage chain changes.

The invention claimed is:

1. A device for constricting and/or separating a sausage strand moving in a direction transport with two separating devices which in relation to said sausage strand are disposed opposite one another, each comprising:
a first disk mounted to be rotatable about a first axis,
a second disk arranged spaced in a vertical direction and rotatable about a second axis with an axis spacing (x) from said first axis,
at least two connecting elements between said first and said second disk, at least one of which comprises a displacement element,
where said connecting elements are mounted to be rotatable in said first disk and in said second disk, whereby said connecting elements are guided such that said at least one displacement element during its rotation about said first axis is always aligned at a predetermined angle, relative to said direction of transport T.

2. The device according to claim 1, wherein said respective connecting element is mounted to be rotatable in said first disk at a respective distance (r) to said first axis and in said second disk at a same distance (r) from said second axis and said distance (r) is equal or different for different connecting elements.

3. The device according to claim 2, wherein said displacement elements of said oppositely disposed separating devices are moved towards one another to such an extent that they constrict and/or sever said sausage strand.

4. The device according to claim 3, wherein said displacement elements are configured to be plate-shaped and comprise a recess, a dimension (a) of which decreases away from a side facing said sausage strand.

5. The device according to claim 1, wherein a separating device comprises at least two connecting elements.

6. The device according to claim 5, wherein the separating device comprises at least three connecting elements and at least 3 displacement elements.

7. The device according to claim 1, wherein said connecting elements are mounted to be rotatable in bores in said first and second disk and are arranged to be exchangeable.

8. The device according to claim 7, wherein said bores are arranged on said first and said second disk, either on a circle having radius (r) or on several circles having different radii (r).

9. The device according to claim 8, wherein one or more displacement elements are used for constricting and at least one displacement element for separating.

10. The device according to claim 9, wherein said device comprises a drive mechanism by which said first disks are driven, where a rotational speed of all disks is equal.

11. The device according to claim 10, wherein said device comprises a control device which controls a drive such that said disks are driven at a constant or variable rotational speed.

12. The device according to claim 11, wherein a speed component of said respective displacement element in said direction of transport during constriction and/or separation corresponds substantially to the speed of a transport device for transporting said sausage strand or
the speed of said respective displacement element during the constriction and/or separation is greater than the speed of said transport device or
said displacement elements are stopped when said displacement elements are presently not constricting and/or separating, so that portions of any length can be produced.

13. The device according to claim 1, wherein several displacement elements are arranged one above the other on a connecting element.

14. The device according to claim 1, wherein said displacement elements on said connecting elements are arranged to be detachable.

15. The device according to claim 1, wherein said connecting elements comprise a first section which extends from a disk substantially perpendicularly in the direction toward said oppositely disposed disk and a second section which extends either horizontally, inclined, step-shaped or wave-shaped toward said oppositely disposed disk at least up to a region of the axis about which said section is mounted to be rotatable, where said first section comprises said displacement element.

16. The device according to claim 1, wherein said device further comprises a third disk and further connecting elements that are mounted to be rotatable in said second and said third disk, where at least one of said connecting elements comprises a displacement element and said second disk is mounted to be rotatable about said second axis.

17. The device according to claim 16, wherein the second disk is mounted to be rotatable about said second axis by way of said connecting elements of said first and said third disk.

18. A method for constricting and/or separating a sausage strand moving in said direction of transport, with a device with two separating devices which in relation to said sausage strand are disposed opposite one another, each comprising: a first disk mounted to be rotatable about a first axis, a second disk arranged spaced in a vertical direction and rotatable about a second axis with an axis spacing (x) from said first axis, at least two connecting elements between said first and said second disk, at least one of which comprises a displacement element, T, where said connecting elements are mounted to be rotatable between said first and said second disk and are guided such that said at least one displacement element, with a rotation of said first disk about said first axis, is always aligned at a predetermined angle, relative to said direction of transport.

19. The method according to claim 18, wherein said disks comprise bores in which said connecting elements are mounted to be rotatable and said bores are arranged either on said first and said second disk on a circle having a radius (r) or on several circles having different radii and said connecting elements are mounted in corresponding bores in dependence of a portion length and/or a sausage size and/or a number of individual portions in a sausage chain and a position of said connecting elements is changed accordingly when the sausage size and/or the portion length and/or the number of individual portions in the sausage chain changes.

* * * * *